US007682695B2

(12) United States Patent
Kugai et al.

(10) Patent No.: US 7,682,695 B2
(45) Date of Patent: Mar. 23, 2010

(54) DUST CORE WITH SPECIFIC RELATIONSHIP BETWEEN PARTICLE DIAMETER AND COATING THICKNESS, AND METHOD FOR PRODUCING SAME

(75) Inventors: Hirokazu Kugai, Itami (JP); Naoto Igarashi, Itami (JP); Toru Maeda, Itami (JP); Kazuhiro Hirose, Itami (JP); Haruhisa Toyoda, Itami (JP); Koji Mimura, Itami (JP); Takao Nishioka, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 887 days.

(21) Appl. No.: 10/597,197

(22) PCT Filed: Jan. 28, 2005

(86) PCT No.: PCT/JP2005/001196

§ 371 (c)(1), (2), (4) Date: Jul. 14, 2006

(87) PCT Pub. No.: WO2005/073989

PCT Pub. Date: Aug. 11, 2005

(65) Prior Publication Data

US 2008/0231409 A1 Sep. 25, 2008

(30) Foreign Application Priority Data

Jan. 30, 2004 (JP) ............................ 2004-023958

(51) Int. Cl.
*B32B 5/16* (2006.01)
*B29C 67/04* (2006.01)

(52) U.S. Cl. ...................... 428/403; 428/404; 428/405; 428/406; 264/125

(58) Field of Classification Search ................. 428/403, 428/404, 405, 406, 407, 447; 264/611, 642, 264/681, 125
See application file for complete search history.

(56) References Cited

U.S. PATENT DOCUMENTS 4,497,722 A * 2/1985 Tsuchida et al. ......... 252/62.54

(Continued)

FOREIGN PATENT DOCUMENTS

JP 10-335128 A 12/1998

(Continued)

OTHER PUBLICATIONS

Walker LDJ Scientific, Inc., "Core Loss Measurements Using a Hysteresigraphs as Copared to a Wattmeter", 2002.*

(Continued)

*Primary Examiner*—H. (Holly) T Le
(74) *Attorney, Agent, or Firm*—Darby & Darby

(57) ABSTRACT

The object of the present invention is to provide a powder core and method for making the same that is equipped with insulative coating having superior heat resistance, with the coating making it possible to adequately restrict the flow of eddy currents between particles.

The powder core is equipped with a plurality of compound magnetic particles bonded to each other. Each of said plurality of composite magnetic particles includes: a metal magnetic particle 10; an insulative lower layer coating 20 surrounding a surface 10*a* of said metal magnetic particle 10; an upper layer coating 30 surrounding said lower layer coating 20 and containing silicon; and dispersed particles 50 containing a metal oxide compound and disposed in said lower layer coating 20 and/or said upper layer coating 30. A mean particle diameter R of the dispersed particles 50 meets the condition 10 nm<R≦2 T, where the average thickness of the coating combining the lower layer coating 20 and the upper layer coating 30 is T.

5 Claims, 3 Drawing Sheets

U.S. PATENT DOCUMENTS

| | | | | |
|---|---|---|---|---|
| 6,102,980 | A * | 8/2000 | Endo et al. | 75/252 |
| 6,527,823 | B2 * | 3/2003 | Moro | 75/246 |
| 7,235,208 | B2 * | 6/2007 | Moro | 264/328.14 |
| 7,544,417 | B2 * | 6/2009 | Maeda et al. | 428/403 |
| 2003/0077448 | A1 * | 4/2003 | Ueta et al. | 428/403 |
| 2008/0152897 | A1 * | 6/2008 | Maeda et al. | 428/323 |

FOREIGN PATENT DOCUMENTS

| | | | |
|---|---|---|---|
| JP | 11-238613 | A | 8/1999 |
| JP | 2002-246219 | A | 8/2002 |
| JP | 2003-234206 | A | 8/2003 |
| JP | 2003-303711 | A | 10/2003 |

OTHER PUBLICATIONS

PCT International Preliminary Report on Patentability for PCT/JP2005/001196 issued on Aug. 22, 2006.

* cited by examiner

DUST CORE WITH SPECIFIC RELATIONSHIP BETWEEN PARTICLE DIAMETER AND COATING THICKNESS, AND METHOD FOR PRODUCING SAME

CROSS-REFERENCE TO PRIOR APPLICATION

This is a U.S. National Phase Application under 35 U.S.C. §371 of International Patent Application No. PCT/JP2005/001196 filed Jan. 28, 2005, and claims the benefit of Japanese Patent Application No. 2004-023958 filed Jan. 30, 2004 both of which are incorporated by reference herein. The International Application was published in Japanese on Aug. 11, 2005 as WO 2005/073989 A1 under PCT Article 21(2).

TECHNICAL FIELD

The present invention relates generally to a powder core and method for making the same. More specifically, the present invention relates to a powder core used in motor cores, reactors for power supply circuits, and the like, and a method for making the same.

BACKGROUND ART

In recent years, there has been a strong demand for compact designs, high efficiency, and high output for electrical devices equipped with an electromagnetic valve, a motor, or a power supply circuit. With these electrical devices, using high frequencies as the operating frequency range is effective. Thus, higher frequencies are being used more and more, e.g., from hundreds of Hz to several kHz for electromagnetic valves, motors, and the like, and from tens of kHz to hundreds of kHz for power supply circuits.

Electrical devices such as electromagnetic valves and motors have been operated primarily with frequencies of no more than hundreds of Hz, and used so-called electromagnetic steel plates as the material for the iron core due to the low iron loss of this material. The iron loss in the core material can be broadly divided into hysteresis loss and eddy current loss. The surfaces of thin plates of an iron-silicon alloy, which has a relatively low coercive force, are insulated, and the plates are stacked to form the electromagnetic steel plate described above. It is known that low hysteresis loss is provided with this structure. While eddy current loss is proportional to the square of the operating frequency, hysteresis loss is linear to the operating frequency. Thus, if the operating frequency is no more than hundreds of Hz, hysteresis loss is dominant. Thus, in this frequency range, the use of electromagnetic steel plates, which have low hysteresis loss, is especially effective.

However, since eddy current loss becomes dominant when the operating frequency is more than 1 kHz, the iron core must be made from a material other than electromagnetic steel plates. Powder cores and soft ferrite cores, which have relatively low eddy current loss properties, are effective in these cases. Powder cores are made using a soft magnetic material in powder form, e.g., iron, an iron-silicon alloy, a Sendust alloy, a permalloy, or an iron-based amorphous alloy. More specifically, a binder member having superior insulation properties is mixed with the soft magnetic material or the surfaces of the powder are insulated, and the resulting powder is compacted to form the powder core.

Soft ferrite cores are known to be especially effective as a material with low eddy current loss since the material itself has a high electrical resistance. However, the low saturation flux density resulting from the use of soft ferrite makes high outputs difficult to obtain. In this regard, powder cores are effective since their main component is soft magnetic material, which has a high saturation flux density.

Also, the making of powder cores involves compacting, and this introduces distortion in the powder due to deformation. This increases coercive force and leads to high hysteresis loss in the powder core. Thus, when a powder core is to be used as a core material, an operation must be performed to remove distortions after the shaped body has been pressed.

One effective way to remove distortions is to perform thermal annealing on the shaped body. Distortions can be removed more effectively and hysteresis loss can be reduced by using higher temperatures for the heat treatment. However, if the heat treatment temperature is set too high, the insulative binder member or the insulative coating in the soft magnetic material can break down or degrade, leading to higher eddy current loss. Thus, heat treatment can be performed only within a temperature range that does not lead to this problem. As a result, the improvement of the heat resistance of the insulative binder member or the insulative coating of the soft magnetic material is an important factor in reducing iron loss in the powder core.

In a representative example of a conventional powder core, approximately 0.05 percent by mass to 0.5 percent by mass of a resin member was added to a pure iron powder formed with a phosphate coating serving as an insulative coating. This was then heated and shaped, and thermal annealing was performed to remove distortion. In this case, the heat treatment temperature was approximately 200 deg C. to 500 deg C., the thermal decomposition temperature of the insulative coating. Because of the low heat treatment temperature, however, adequate distortion removal could not be obtained.

Japanese Laid-Open Patent Publication Number 2003-303711 discloses an iron base powder and powder core using the same that includes a heat-resistant insulation coating wherein the insulation is not destroyed when annealing is performed to reduce hysteresis loss (Patent Document 1). With the iron base powder disclosed in Patent Document 1, the surfaces of a powder having iron as its main component are covered with a coating containing silicone resin and pigment. It would be preferable for a coating containing a material such as a silicon compound to serve as a lower layer of the coating containing silicone resin and pigment. For the pigment, a powder with a D50 rating and having a mean particle diameter of 40 microns would be preferable.

[Patent Document 1] Japanese Laid-Open Patent Publication Number 2003-303711

DISCLOSURE OF INVENTION

As described above, the powder core is made by compacting the soft magnetic material in a powder form. However, when the iron base powder disclosed in Patent Document 1 is compacted, there is significant abrasion between coatings disposed on powder surfaces, resulting in a powder core in which coatings have been destroyed. This leads to eddy current flowing between the iron base particles, resulting in increased iron loss in the powder core due to eddy current loss. Also, when the iron base powder is compacted, a force is applied to compress the coating disposed on the powder surface, resulting in a powder core in which coatings are thinner at certain sections. This prevents the coating from performing adequately as an insulation coating at the thin sections, similarly resulting in increased iron loss in the powder core due to eddy current loss.

The object of the present invention is to overcome these problems and to provide a powder core and method for making the same that is equipped with insulative coating having superior heat resistance, with the coating making it possible to adequately restrict the flow of eddy currents between particles.

A powder core according to the present invention is equipped with a plurality of composite magnetic particles bonded to each other. Each of the plurality of compound magnetic particles includes: the metal magnetic particle 10; the lower layer coating 20 surrounding the surface 10a of the metal magnetic particle 10; the upper layer coating 30 that surrounds the surface 20a of the lower layer coating 20 and contains silicon; and the dispersed particles 50, containing a metal oxide, disposed in the lower layer coating 20 and/or the upper layer coating 30. The mean particle diameter R of the dispersed particles meets the condition 10 nm<R≦2 T, where T is the average thickness of the coating, which combines the lower layer coating and the upper layer coating.

In this powder core, an upper layer coating containing silicon (Si) is disposed to cover the surface of the insulative lower layer coating. The upper layer coating containing silicon undergoes thermal decomposition at temperatures from approximately 200 deg C. to 300 deg C., but thermal decomposition generally causes it to change into an Si—O based compound having heat resistance up to approximately 600 deg C. Also, the dispersed particles containing a metal oxide has heat resistance for high temperatures of 1000 deg C. or higher. Thus, the heat resistance of the Si—O based compound which has changed due to thermal decomposition can be further improved by the presence of dispersed particles containing metal oxide in the upper layer coating. As a result, when heat treatment to remove distortions in the powder core is performed, the degradation of the upper layer coating can be limited. Also, limiting the degradation of the upper layer coating can protect the lower layer coating below it. This makes it possible to reduce hysteresis loss resulting from high-temperature heat treatment so that eddy current loss in the powder core can be reduced by the upper layer coating and the lower layer coating.

The dispersed particles disposed on the lower layer coating and/or the upper layer coating act as a spacer separating adjacent metal magnetic particles when compacting is being performed to make the powder core. Since the mean particle diameter R of the dispersed particles exceeds 10 nm, the dispersed particles will not be too small. As a result, insulative particles can serve adequately as spacers between the metal magnetic particles, thus providing more reliable reduction of eddy current loss in the powder core.

Also, the mean particle diameter R of the dispersed particles is no more than twice the thickness T of the coatings. Thus, the mean particle diameter of the dispersed particles will not be too large relative to the thickness of the coatings, allowing the dispersed particles to be supported in the coatings in a stable manner. As a result, dispersed particles are prevented from falling out of the coatings, making it possible to obtain the advantages of the dispersed particles described above in a reliable manner. Also, when compacting is performed to form the powder core, the dispersed particles do not obstruct plastic deformation of the metal magnetic particles, making it possible to increase the density of the shaped body obtained after compacting. Furthermore, during compacting, the dispersed particles prevent the upper layer coating and the lower layer coating from being destroyed and limit formation of gaps between adjacent metal magnetic particles. As a result, the insulation between the metal magnetic particles can be maintained and demagnetization fields can be prevented from forming between particles. Furthermore, by using a two-layer structure for the coating, the upper layer coating and the lower layer coating can slide and shift relative to each other during compacting. This prevents the upper layer coating from tearing during deformation of the metal magnetic particle, thus providing a uniform upper layer coating that acts as a protective coating.

It would be preferable for the lower layer coating to include at least one compound selected from a group consisting of a phosphorous compound, a silicon compound, a zirconium compound, and an aluminum compound. With this type of powder core, the superior insulation properties of these materials makes it possible to efficiently restrict eddy current flow between metal magnetic particles.

It would also be preferable for the dispersed particles to include at least one oxide selected from a group consisting of silicon oxide, aluminum oxide, zirconium oxide, and titanium oxide. With this type of powder core, these materials can provide suitably high heat resistance. Thus, if the dispersed particles are present in the upper layer coating, the heat resistance of the upper layer coating can be efficiently improved.

It would also be preferable for the average thickness of the lower layer coating to be at least 10 nm and no more than 1 micron. With this type of powder core, setting the average thickness of the lower layer coating to at least 10 nm makes it possible to restrict tunnel currents flowing through the coating and prevents increased eddy current loss resulting from these tunnel currents. Also, since the average thickness of the lower layer coating is no more than 1 micron, it is possible to prevent the distance between metal magnetic particles from becoming too large so that demagnetization fields are generated (energy is lost due to magnetic poles being generated in the metal magnetic particles). This makes it possible to restrict increased hysteresis loss generated by demagnetization fields. Also, it is possible to prevent reduced saturation flux density resulting from the lower layer coating having too low a proportion in volume in the powder core.

It would be preferable for the average thickness of the upper layer coating to be at least 10 nm and no more than 1 micron. With this type of powder core, the upper layer coating is provided with a certain degree of thickness since its average thickness is at least 10 nm. This makes it possible for the upper layer coating to function as a protective film during the heat treatment of the powder core. Also, since the average thickness of the upper layer coating is no more than 1 micron, it is possible to prevent the generation of demagnetization fields due to the distance between metal magnetic particles becoming too large. This makes it possible to restrict increased hysteresis loss caused by demagnetization fields.

A method for making a powder core according to the present invention is a method for making any of the powder cores described above. The method for making a powder core includes: a step for forming a shaped body by shaping the plurality of metal magnetic particles; and a step for heat treating the shaped body at a temperature of at least 500 deg C. and less than 800 deg C. With this method for making a powder core, the use of a high temperature of at least 500 deg C. for heat treatment of the shaped body makes it possible to adequately reduce distortions present in the shaped body. This makes it possible to obtain a powder core with low hysteresis loss. Also, since the heat treatment temperature is less than 800 deg C., the deterioration of the upper layer coating and the lower layer coating due to high temperatures is avoided.

With the present invention as described above, it is possible to provide a powder core and method for making the same that includes an insulative coating with superior heat resistance and that can adequately restrict eddy current flow between particles by efficiently using the coating.

LIST OF DESIGNATORS

10: metal magnetic particle; 10*a*, 20*a*: surface; 20: lower layer coating; 25: coating; 30: upper layer coating; 40: compound magnetic particles; 50: dispersed particles Best Mode for Carrying Out the Invention The embodiments of the present invention will be described, with references to the figures.

Figure 1:
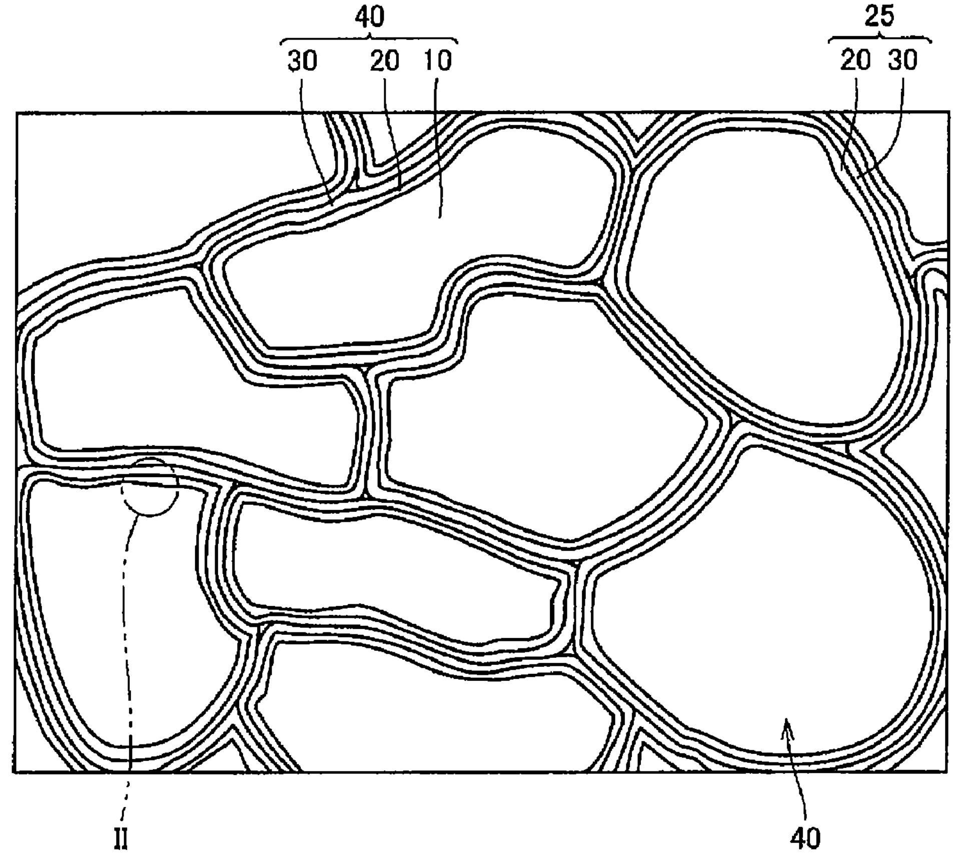
FIG. 1 is a simplified drawing showing the surface of a powder core according to an embodiment of the present invention.
Figure 2:
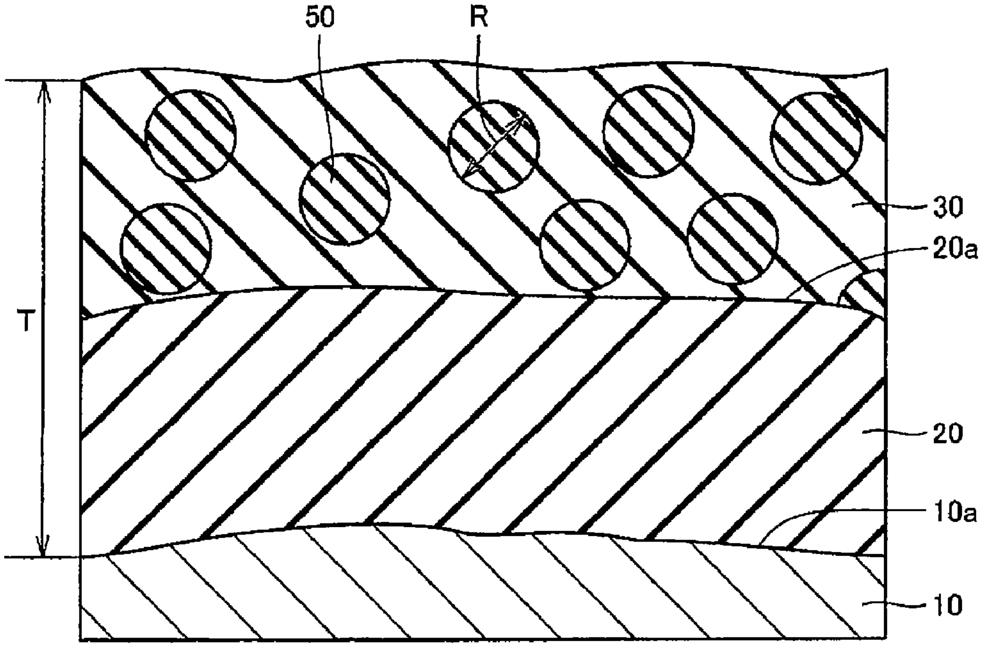
FIG. 2 is a simplified detail drawing showing the section surrounded by the dotted line II from FIG. 1.

FIG. 1 is a simplified drawing showing the surface of the powder core of this embodiment. FIG. 2 is a simplified drawing showing the section in FIG. 1 surrounded by dotted line II.

Referring to FIG. 1 and FIG. 2, a powder core includes a plurality of compound magnetic particles 40 formed from: a metal magnetic particle 10; a lower layer coating 20 surrounding a surface 10*a* of the metal magnetic particle 10; and an upper layer coating 30 that surrounds the surface 20*a* of the lower layer coating 20 and contains silicon (Si). The compound magnetic particles 40 are bonded to each other by the engagement of the projections and indentations of the compound magnetic particles 40.

The powder core also includes a plurality of dispersed particles 50 embedded in the upper layer coating 30. The dispersed particles 50 contain a metal oxide. The plurality of dispersed particles 50 is dispersed roughly uniformly inside the upper layer coating 30. A coating 25 of the metal magnetic particle 10 formed from the lower layer coating 20 and the upper layer coating 30 has an average thickness T. The dispersed particles 50 have a mean particle diameter R. The mean particle diameter R of the dispersed particles 50 meets the condition 10 nm$<$R$\leqq$2 T.

The average thickness T referred to here is determined in the following manner. Film composition is obtained through composition analysis (TEM-EDX: transmission electron microscope energy dispersive X-ray spectroscopy) and atomic weight is obtained through inductively coupled plasma-mass spectrometry (ICP-MS). These are used to determine equivalent thickness. Furthermore, TEM photographs are used to directly observe the coating and confirm the order of the calculated equivalent thickness. The mean particle diameter referred to here indicates a 50% particle diameter D, i.e., with a particle diameter histogram measured using the laser scattering diffraction method, the particle diameter of particles for which the sum of the mass starting from the lower end of the histogram is 50% of the total mass.

The metal magnetic particle 10 is formed from a material with high saturation flux density and low coercive force, e.g., iron (Fe), an iron (Fe)-silicon (Si)-based alloy, an iron (Fe)-nitrogen (N)-based alloy, an iron (Fe)-nickel (Ni)-based alloy, an iron (Fe)-carbon (C)-based alloy, an iron (Fe)-boron (B)-based alloy, an iron (Fe)-cobalt (Co)-based alloy, an iron (Fe)-phosphorous (P)-based alloy, an iron (Fe)-nickel (Ni)-cobalt (Co)-based alloy, or an iron (Fe)-aluminum (Al)-silicon (Si)-based alloy. Of these, it would be preferable for the metal magnetic particle 10 to be formed from pure iron particles, iron-silicon (more than 0 and no more than 6.5 percent by mass) alloy particles, iron-aluminum (more than 0 and no more than 5 percent by mass) alloy particles, permalloy alloy particles, electromagnetic stainless steel alloy particles, Sendust alloy particles, or iron-based amorphous alloy particles.

It would be preferable for the mean particle diameter of the metal magnetic particles 10 to be at least 5 microns and no more than 300 microns. With a mean particle diameter of at least 5 microns for the metal magnetic particle 10, oxidation of the metal magnetic particles 10 becomes more difficult, thus improving the magnetic properties of the soft magnetic material. With a mean particle diameter of no more than 300 microns for the metal magnetic particle 10, the compressibility of the mixed powder is not reduced during the compacting operation. This provides a high density for the shaped body obtained from the compacting operation.

The lower layer coating 20 is formed from a material having at least electrical insulation properties, e.g., a phosphorous compound, a silicon compound, a zirconium compound, or an aluminum compound. Examples of this type of material include: ferric phosphate, which contains phosphorous and iron, manganese phosphate, zinc phosphate, calcium phosphate, silicon oxide, titanium oxide, aluminum oxide, and zirconium oxide.

The lower layer coating 20 serves as an insulation layer between the metal magnetic particles 10. By covering the metal magnetic particle 10 with the lower layer coating 20, the electrical resistivity p of the powder core can be increased. As a result, the flow of eddy currents between the metal magnetic particles 10 can be prevented and iron loss in the powder core resulting from eddy currents can be reduced.

An example of a method for forming the lower layer coating 20 with a phosphorous compound on the metal magnetic particle 10 is to perform wet coating using a solution in which a metallic salt phosphate and phosphoric ester are dissolved in water or an organic solvent. Examples of methods for forming the lower layer coating 20 with a silicon compound on the metal magnetic particle 10 include: wet coating a silicon compound such as a silane coupling agent, a silicone resin, or silazane; and using the sol-gel method to coat silica glass and silicon oxide.

Examples of methods for forming the lower layer coating 20 with a zirconium compound on the metal magnetic particle 10 include: wet coating a zirconium coupling agent; and using the sol-gel method to coat zirconium oxide. Examples of methods for forming the lower layer coating 20 with an aluminum compound on the metal magnetic particle 10 include using the sol-gel method to coat aluminum oxide. The methods for forming the lower layer coating 20 are not limited to those described above and various methods suited for the lower layer coating 20 to be formed can be used.

It would be preferable for the average thickness of the lower layer coating 20 to be at least 10 nm and no more than 1 micron. This makes it possible to prevent increases in eddy current loss caused by tunnel current and prevent increases in hysteresis loss caused by the demagnetization field generated between the metal magnetic particles 10. It would be more preferable for the average thickness of the lower layer coating 20 to be no more than 500 nm and even more preferable for the average thickness to be no more than 200 nm.

The upper layer coating 30 is formed from a silicon compound containing silicon. There are no special restrictions on this silicon compound, but examples include silicon oxide, silica glass, and silicone resin.

Examples of methods for forming the upper layer coating 30 include: forming the upper layer coating 30 by using the sol-gel method, wet coating, vapor-phase deposition or the like on the metal magnetic particles 10 on which the lower layer coating 20 is formed; and forming the upper layer coating 30 by placing a compact of the metal magnetic particles 10 formed with the lower layer coating 20 in a gas containing silicon and applying heat treatment. The methods for forming the upper layer coating 30 are not limited to those described above and various methods suited for the upper layer coating 30 to be formed can be used.

Figure 3:
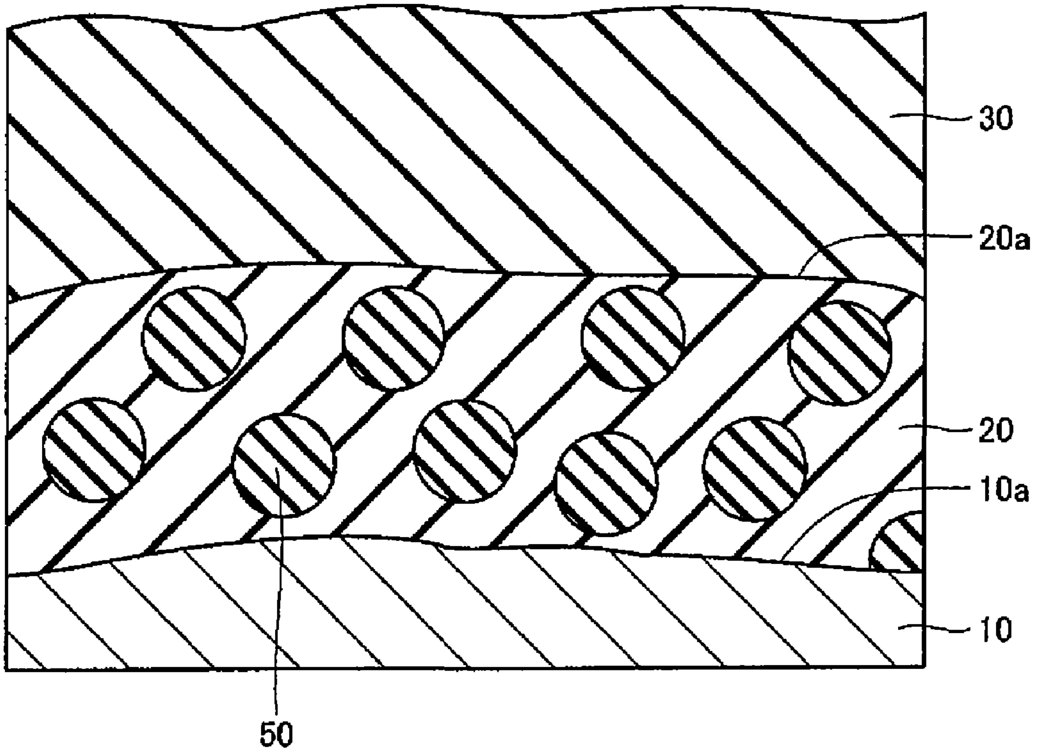
FIG. 3 is a simplified drawing showing an alternative example of the arrangement of dispersed particles shown in FIG. 2.
Figure 4:
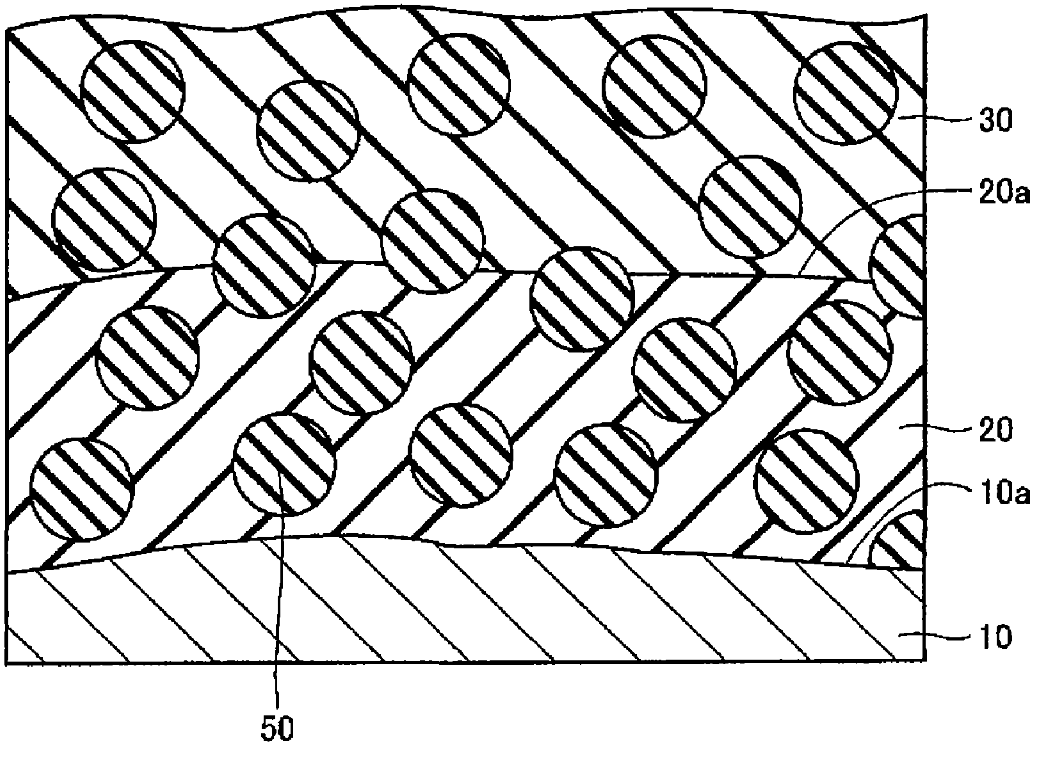
FIG. 4 is a simplified drawing showing another alternative example of the arrangement of dispersed particles shown in FIG. 2.

FIG. 3 and FIG. 4 are simplified drawing showing alternative examples for placement of the dispersed particles shown in FIG. 2. Referring to FIG. 3, the dispersed particles 50 can be embedded inside the lower layer coating 20. Referring to FIG. 4, the dispersed particles 50 can be embedded inside both the lower layer coating 20 and the upper layer coating 30. The dispersed particles 50 are embedded in the lower layer coating 20 and/or the upper layer coating 30, i.e., embedded somewhere in the coating 25.

Referring to FIG. 2 through FIG. 4, the dispersed particle 50 is formed from a metal oxide such as silicon oxide, aluminum oxide, zirconium oxide, or titanium oxide. Methods for dispersing the dispersed particles 50 in the coating 25 include: mixing in the dispersed particles 50 in a powder state during the formation of the lower layer coating 20 or the upper layer coating 30; and precipitating the dispersed particles 50 onto the coating. The methods that can be used are not restricted to these methods, however.

The powder core of this embodiment of the present invention is equipped with a plurality of compound magnetic particles 40 bonded to each other. Each of the plurality of compound magnetic particles 40 includes: the metal magnetic particle 10; the lower layer coating 20 surrounding the surface 10*a* of the metal magnetic particle 10; the upper layer coating 30 that surrounds the surface 20*a* of the lower layer coating 20 and contains silicon; and the dispersed particles 50, containing a metal oxide, disposed in the lower layer coating 20 and/or the upper layer coating 30. The mean particle diameter R of the dispersed particles 50 meets the condition 10 nm$<R\leqq 2$ T, where T is the average thickness of the coating 25, which combines the lower layer coating 20 and the upper layer coating 30.

Next, a method for making the powder core shown in FIG. 1 will be described. First, the lower layer coating 20 is formed on the surface 10*a* of the metal magnetic particle 10 and the upper layer coating 30 is formed on the surface 20*a* of the lower layer coating 20 using a predetermined method described above. Also, at the same time these coatings are being formed, the dispersed particles 50 are placed somewhere in the coating 25. Since the mean particle diameter R of the dispersed particles 50 is no more than twice the average thickness T of the coating 25, the dispersed particles 50 can be disposed inside the coating 25 in a reliably supported state. The compound magnetic particles 40 are obtained with the steps described above.

Next, the compound magnetic particles 40 are placed in a die and compacted at a pressure, e.g., 700 MPa-1500 MPa. This compacts the compound magnetic particles 40 and provides a shaped body. While it would be possible to use an open-air atmosphere, it would be preferable for the compacting to be performed in an inert gas atmosphere or a decompressed atmosphere. This makes it possible to limit oxidation of the compound magnetic particles 40 caused by the oxygen in the open air.

When compacting, the dispersed particles 50 embedded in the coating 25 are present between adjacent metal magnetic particles 10. The dispersed particles 50 serve as spacers that limit the physical contact between the metal magnetic particles 10 and prevent the shaped body from being formed with adjacent metal magnetic particles 10 in contact with each other. Since the mean particle diameter R of the dispersed particles 50 exceeds 10 nm, there is no possibility that the dispersed particles 50 would not be able to function as spacers because they are too small. Thus, the coating 25 with a thickness exceeding 10 nm can be reliably interposed between the adjacent metal magnetic particles 10, thus maintaining insulation between them.

Also, since the mean particle diameter R of the dispersed particles 50 is no more than twice the average thickness T of the coating 25, the dispersed particles 50 will not be a physical obstacle when compacting is performed. This makes it possible to avoid destruction of the coating 25 by the flow of the dispersed particles 50 during compacting as well as obstruction to the deformation of the metal magnetic particle 10 due to dispersed particles 50.

Next, the shaped body obtained from compaction is heated to a temperature of at least 500 deg C. and less than 800 deg C. This makes it possible to remove distortions and dislocations present in the shaped body. The upper layer coating 30, which is formed from silicone resin or the like and is heat resistant, serves as a protective film to protect the lower layer coating 20 from heat. Thus, there is no degradation to the lower layer coating 20 even when high heat of at least 500 deg C. is applied. The atmosphere in which the heat treatment takes place can be the open air, but it would be preferable for an inert gas atmosphere or a decompression atmosphere to be used. This makes it possible to limit oxidation of the compound magnetic particles 40 caused by the oxygen in the open air.

It would be preferable for the average thickness of the upper layer coating 30 to be at least 10 nm and no more than 1 micron. This makes it possible to efficiently limit degradation of the lower layer coating 20 during the heat treatment operation and to prevent increases in hysteresis loss caused by demagnetization fields generated between the metal magnetic particle 10. It would be more preferable for the average thickness of the upper layer coating 30 to be no more than 500 nm, and even more preferable for it to be no more than 200 nm.

After heat treatment, the shaped body is processed as appropriate, e.g., extrusion or cutting, resulting in the powder core shown in FIG. 1.

With the powder core and method for making a powder core described above, the shaped body can be heated at a high temperature of at least 500 deg C., making it possible to adequately reduce hysteresis loss in the powder core. Since the lower layer coating 20 and the upper layer coating 30 does not degrade even when this heat treatment is performed, these coatings can reduce eddy current loss in the powder core. This makes it possible to provide a powder core with adequately reduced iron loss.

EXAMPLES

The powder core of the present invention was evaluated using the examples described below.

For the metal magnetic particle 10, the commercially available atomized pure iron powder (product name "ABC100.30") from Hoganas Corp. was used. This atomized pure iron powder was immersed in a ferric phosphate aqueous solution and stirred to form on the surface of the atomized pure iron powder a ferric phosphate compound coating, serving as the lower layer coating 20. Phosphoric acid compound coatings with average thicknesses of 50 nm and 100 nm were prepared.

Next, silicone resin (product name "XC96-BO446") from GE Toshiba Silicone Co., Ltd. and silicon dioxide powder is dissolved and dispersed in ethyl alcohol, and the coated atomized pure iron powder described above was deposited in the solution. The silicone resin was dissolved so that it was 0.25 percent by mass relative to the atomized pure iron powder and the silicon dioxide powder was dissolved so that it was 0.02 percent by mass of the atomized pure iron powder. Three types of mean particle diameters for the silicon dioxide powder were used: 10 nm, 30 nm, and 50 nm. Then, after stirring and drying, a silicone resin layer having an average thickness of 100 nm was formed as the upper layer coating 30, resulting in the compound magnetic particles 40 in which silicon dioxide powder dispersed in the silicone resin serves as the dispersed particles 50.

Next, this powder was compacted with a surface pressure of 1275 MPa (=13 ton/cm$^2$) to form ring-shaped shaped bodies (35 mm outer diameter, 20 mm inner diameter, 5 mm thickness). Then, the shaped bodies were heated in a nitrogen atmosphere under different temperature conditions from 400 deg C. to 1000 deg C. Based on the above steps, a plurality of powder core materials were prepared with different lower layer coating thicknesses, dispersed particle diameters, and heat treatment temperature conditions.

As a comparative sample, powder core materials were prepared using the method described above with: atomized pure iron powder with only a ferric phosphate compound coating (resin was added as a binder at a proportion of 0.05 percent by mass relative to the atomized pure iron powder); and atomized iron powder with no silicon dioxide powder and only a ferric phosphate compound coating and silicone resin coating.

Next, coils (300 windings on the primary side and 20 windings on the secondary side) were wound uniformly around the powder core material and the iron loss characteristics of the powder core material were evaluated. For the evaluation, RikenDenshi Corp.'s BH tracer (model ACBH-100K) was used with an excitation magnetic flux density of 1 (T: tesla) and a measurement frequency of 1000 Hz. Table 1 shows the iron loss values measured for the different powder core materials.

Figure 5:
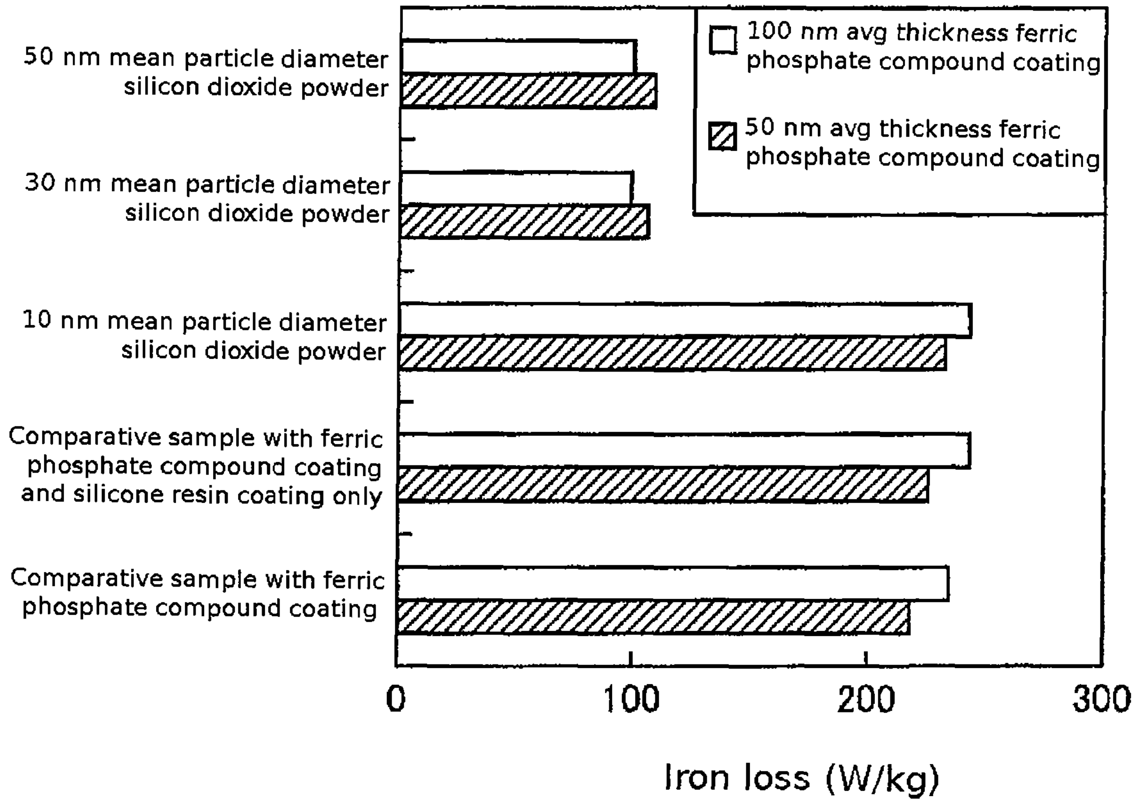
FIG. 5 is a graph comparing the minimum iron loss values obtained by powder core materials based on this embodiment.

FIG. 5 is a graph comparing the minimum iron losses obtained from the powder core materials of this example. Referring to FIG. 5, an iron loss of approximately 100 W/kg was obtained for powder core materials in which the silicon dioxide particle mean particle diameter was 30 nm and 50 nm. This was no more than half the iron loss values of approximately 220 W/kg obtained with the powder core materials from the comparative samples and the sample with the silicon dioxide particle mean particle diameter of 10 nm. Based on these results, it was possible to confirm that the powder core material prepared according to the present invention provided superior low iron loss material.

The embodiments and examples disclosed herein are illustrative and should not be considered restrictive. The scope of the present invention is indicated by the claims of the invention and not by the description above, and the scope includes all equivalences and modifications within the scope of the claim.

The invention claimed is:

1. A powder core comprising: a plurality of composite magnetic particles bonded to each other;

TABLE 1

| Avg thickness of ferric phosphate compound coating (nm) | Avg thickness of silicone resin coating (nm) | Heat treatment temp (deg C.) | Mean particle diameter of silicon dioxide particles (nm) 10 | 30 | 50 | Comparative sample with ferric phosphate compound coating and silicone resin coating only | Comparative sample with ferric phosphate compound coating only |
|---|---|---|---|---|---|---|---|
| | | | Iron loss value (W/kg) | | | | |
| 50 | 100 | 400 | 234 | 231 | 236 | 226 | 219 |
| | | 500 | 245 | 177 | 182 | 319 | 936 |
| | | 600 | 560 | 132 | 129 | 773 | 3275 |
| | | 700 | 2540 | 105 | 109 | 2923 | Unmeasurable |
| | | 800 | Unmeasurable | 245 | 423 | Unmeasurable | Unmeasurable |
| | | 900 | Unmeasurable | 980 | 1203 | Unmeasurable | Unmeasurable |
| | | 1000 | Unmeasurable | 2988 | 3874 | Unmeasurable | Unmeasurable |
| 100 | 100 | 400 | 244 | 250 | 239 | 243 | 236 |
| | | 500 | 268 | 165 | 180 | 276 | 785 |
| | | 600 | 489 | 119 | 121 | 420 | 2363 |
| | | 700 | 2108 | 98 | 101 | 1825 | 4833 |
| | | 800 | 4892 | 188 | 278 | 4902 | Unmeasurable |
| | | 900 | Unmeasurable | 678 | 990 | Unmeasurable | Unmeasurable |
| | | 1000 | Unmeasurable | 2540 | 3666 | Unmeasurable | Unmeasurable |

Referring to Table 1, with the comparative sample having only the ferric phosphate compound coating and the comparative sample with only the ferric phosphate compound coating and the silicone resin coating, the iron loss value was lowest when the heat treatment temperature was 400 deg C., with the value increasing for higher heat treatment temperatures. Based on this, it was determined that the ferric phosphate compound coating serving as the lower layer coating 20 in the comparative samples did not function effectively in the heat treatment.

In contrast, with the powder core material containing silicon dioxide particles with mean particle diameters of 30 nm and 50 nm, iron loss was reduced as the heat treatment temperature increased, with iron loss increasing at a heat treatment temperature of 800 deg C. Based on this, it was possible to confirm that, at least in the heat treatment temperature range of up to 700 deg C., the lower layer coating 20 does not degrade and eddy currents generated between atomized pure iron particles were efficiently limited. On the other hand, these results could not be obtained for powder core materials with silicon dioxide particles with a mean particle diameter of 10 nm.

wherein each of said plurality of composite magnetic particles includes:

a metal magnetic particle, an insulative lower layer coating surrounding a surface of said metal magnetic particle, an upper layer coating surrounding said lower layer coating and containing silicon, and dispersed particles containing a metal oxide compound and disposed in said upper layer coating and/or said lower layer coating;

wherein said dispersed particles includes at least one oxide selected from the group consisting of silicon oxide and aluminum oxide; and wherein a mean particle diameter R of said dispersed particles meets a condition $10\text{ nm}<R\leqq 2T$ where T is an average thickness of a coating formed from said lower layer coating and said upper layer coating.

2. A powder core according to claim 1 wherein said lower layer coating includes at least one compound selected from a group consisting of a phosphorous compound, a silicon compound, a zirconium compound, and an aluminum compound.

3. A powder core according to claim 1 wherein said lower layer coating has an average thickness of at least 10 nm and no more than 1 micron.

4. A powder core according to claim 1 wherein said upper layer coating has an average thickness of at least 10 nm and no more than 1 micron.

5. A method for making a powder core according to claim 1 comprising:

a step for forming a shaped body by shaping said plurality of metal magnetic particles; and a step for heat treating said shaped body at a temperature of at least 500 deg C. and less than 800 deg C.

* * * * *

UNITED STATES PATENT AND TRADEMARK OFFICE

CERTIFICATE OF CORRECTION

PATENT NO. : 7,682,695 B2
APPLICATION NO. : 10/597197
DATED : March 23, 2010
INVENTOR(S) : Kugai et al.

It is certified that error appears in the above-identified patent and that said Letters Patent is hereby corrected as shown below:

In Claim 5, at Column 12, line 4, replace "metal" with --composite--.

Signed and Sealed this

Sixteenth Day of November, 2010

David J. Kappos

*Director of the United States Patent and Trademark Office*